Patented May 16, 1933

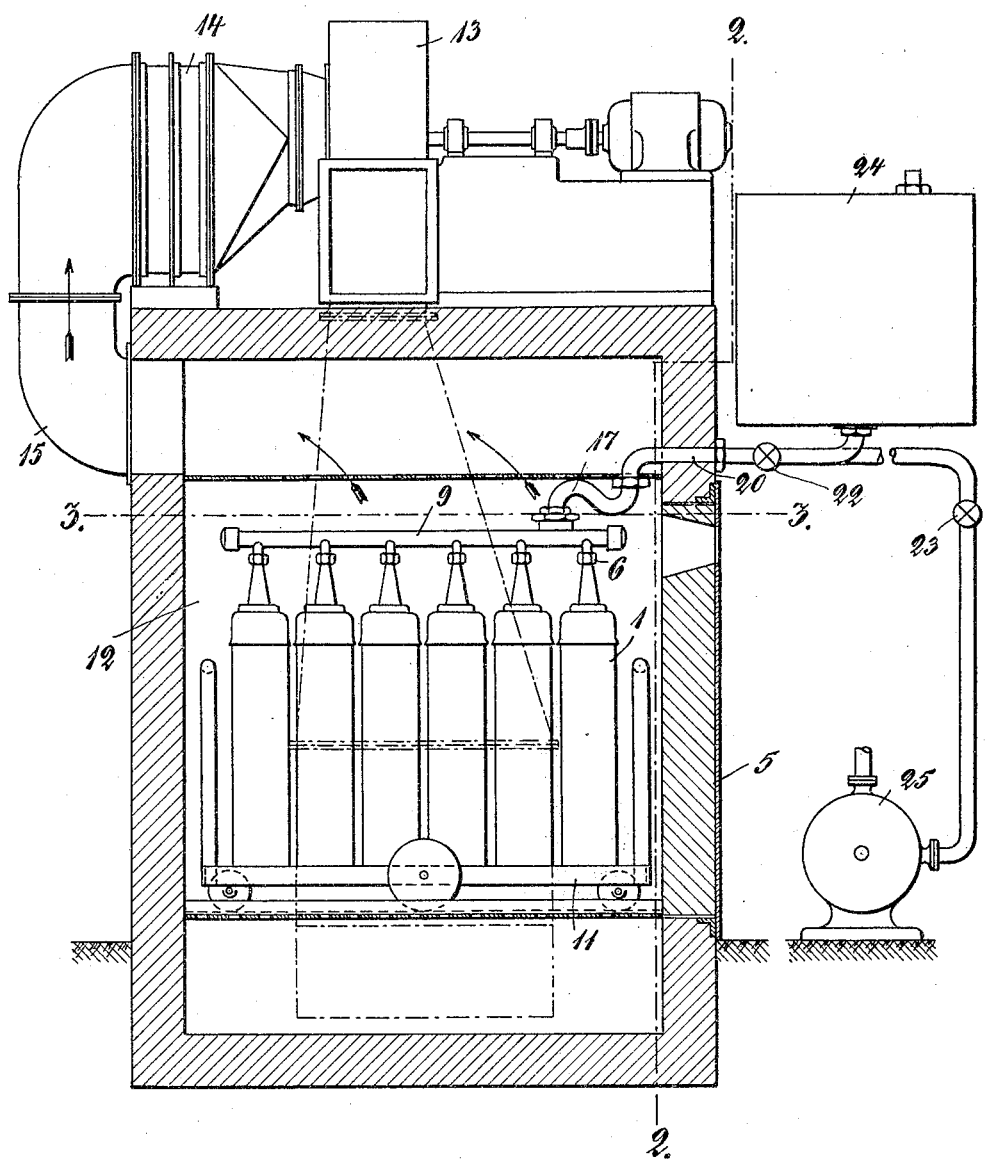

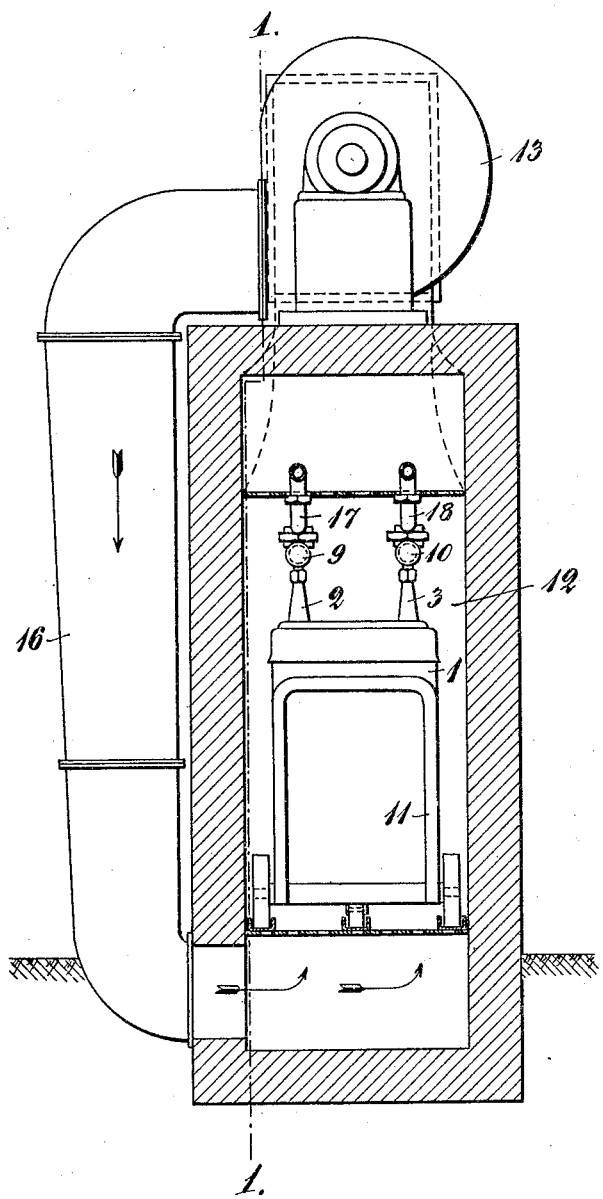

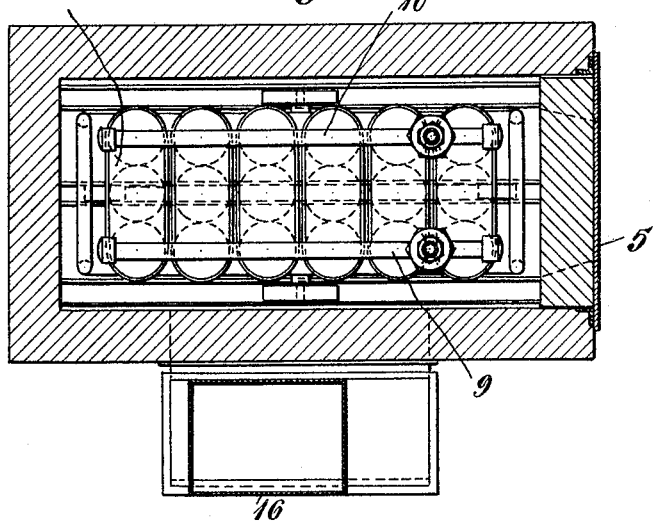
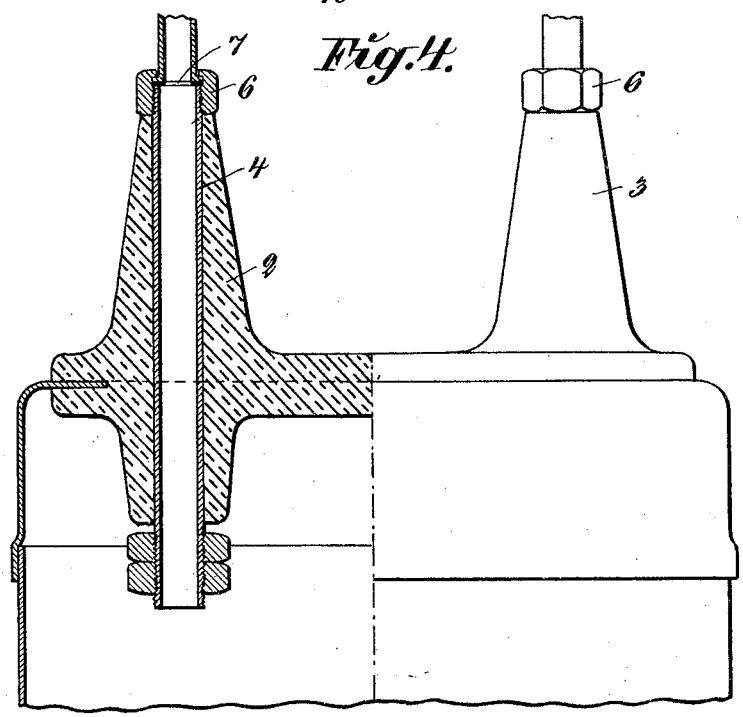

1,909,575

UNITED STATES PATENT OFFICE

BERNHARD SOPHUS FAITH ELL, OF SPANGA, AND HENNING SPANNE, OF SUNDBYBERG, SWEDEN, ASSIGNORS TO TELEFONAKTIEBOLAGET L. M. ERICSSON, OF STOCKHOLM, SWEDEN, A COMPANY OF SWEDEN

DRYING ARRANGEMENT FOR CONDENSERS

Application filed December 16, 1931, Serial No. 581,463, and in Sweden June 9, 1931.

The present invention refers to an arrangement for carrying out the known method for the drying and subsequent impregnation of condensers according to which the hermetically sealed condenser tanks are connected to a vacuum arrangement and also to a storage reservoir for impregnating liquid by means of separate pipe lines provided with cocks and are thereafter introduced into a suitable heating chamber or oven in which they are heated to a suitable temperature, the cock in the impregnating line being closed and the cock in the evacuating line open, whereupon, after all moisture has been removed, the cock in the vacuum line is closed and the cock in the impregnating line opened, the condenser tanks being then filled with impregnating liquid.

In previously known arrangements for carrying out the above mentioned method special openings have been provided for the evacuation and for the introduction of impregnating liquid. This however causes considerable inconveniences. For instance, particularly in small condensers, difficulties arise in finding room for any additional openings which are capable of being hermetically sealed, and which openings would also weaken the cover, which, during the evacuating process, is subjected to the full pressure of the outer air. The necessity of providing special openings with appertaining closing means also considerably increases the cost of manufacture.

In the arrangement according to the present invention the vacuum pump and the storage reservoir communicate with the interior of the condenser tanks by means of the bolts of the electric leading-in insulators, said bolts being provided with a bore for this purpose, whereby the above mentioned inconveniences are overcome. Such an arrangement has the additional advantage that when several condensers are electrically connected together by means of tubular conductors a communication path is obtained for the oil. For a condenser battery connected together in this manner evidently only one oil conservator is required. In receptacles not communicating with a conservator, i. e. in receptacles which are hermetically sealed and in which a cushion of air or some other inert gas is required, the volume of said gas cushion may be determined in a simple manner by extending the tubular leading-in insulator bolts into the receptacle a distance corresponding to the desired volume.

The invention will now be described with reference to the accompanying drawings in which Figure 1 shows a horizontal section through a drying and impregnating arrangement according to the invention, the section being taken on the line 1—1 in Figure 2.

Figure 2 shows a cross section through the same drying and impregnating arrangement on the line 2—2 in Figure 1.

Figure 3 is a horizontal section on the line 3—3 in Figure 1, and

Figure 4 shows, on a larger scale and partly in section, a condenser tank having tubular leading-in insulator bolts according to the invention.

In Figures 1 to 3 are shown six condenser tanks 1 each of which is provided with two leading-in insulators 2 and 3, having the tubular insulator bolts 4 hermetically connected to metal pipes 9 and 10 respectively by means of screw caps 6 and packing discs 7 as shown more in detail in Figure 4.

The condenser tanks thus connected together are placed on a carriage 11 which has been introduced through the door 5 into the heating chamber proper 12 of a heating oven heated by means of air or other heating fluid which by means of a motor-driven fan 13 is made to circulate in a closed circulating system comprising a heat source 14 connected to the suction side of a fan and ducts 15 and 16 which connect the heating chamber with the heat source and with the pressure side of the fan respectively.

The two pipes 9 and 10 are connected to a storage reservoir 24 for impregnating liquid and to a vacuum pump 25 respectively by means of flexible tubes 17 and 18 and pipes 20 and 21 passing through the wall of the heating chamber, stop cocks 22 and 23 being provided in the pipes 20 and 21.

During the drying operation of the condensers 1 in the heating chamber 12 the cock 22 is closed but the cock 23 open, i. e., the condenser tanks communicate with the vacuum pump 25. The purpose of the heating chamber is to supply to the electrical condensers enclosed in the condenser tanks 1 the heat required for converting the moisture held by the condensers into steam and to raise their temperature to the highest degree permissible without damaging the insulating material, whereby the pressure of the saturated steam in the tanks is raised rendering possible a rapid and efficient removal of the moisture by means of the vacuum pump 25. When all moisture has been removed from the condensers the cock 23 is closed and the cock 22 opened, the tank being then filled with impregnating liquid from the storage reservoir 24. In condensers adapted to be connected to an expansion vessel additional oil is filled into the tank according as the oil penetrates into the condensers. In condensers without expansion vessels the oil absorbed is compensated for by an inert gas, for instance nitrogen, which form a gas cushion immediately below the cover and renders possible an expansion and contraction of the oil upon changes in temperature without the tank then being subjected to high mechanical stresses. The volume of the gas cushion at the moment when the tank is sealed is determined in a simple manner by giving a suitable length to those parts of the leading-in insulator bolts which extend into the tank.

We claim:

An arrangement for the drying and subsequent impregnation with insulating liquid of condensers or other electrical apparatus comprising in combination protecting tanks adapted to enclose said electrical apparatus permanently, leading-in insulators in said tanks, tubular leading-in bolts in said leading-in insulators, evacuating means, storage means for insulating liquid, means for effecting communication between said evacuating means and the interior of the tanks by said tubular leading-in bolts, means for raising the temperature of said tanks and apparatus enclosed therein, and means effecting communication between said storage means and the interior of said tanks by said tubular leading-in bolts.

In testimony whereof we affix our signatures.

BERNHARD SOPHUS FAITH ELL.
HENNING SPANNE.